No. 673,834. Patented May 7, 1901.
E. FINN.
COMPUTING EVEN BALANCE SCALE.
(Application filed Dec. 27, 1897.)
(No Model.) 3 Sheets—Sheet 1.
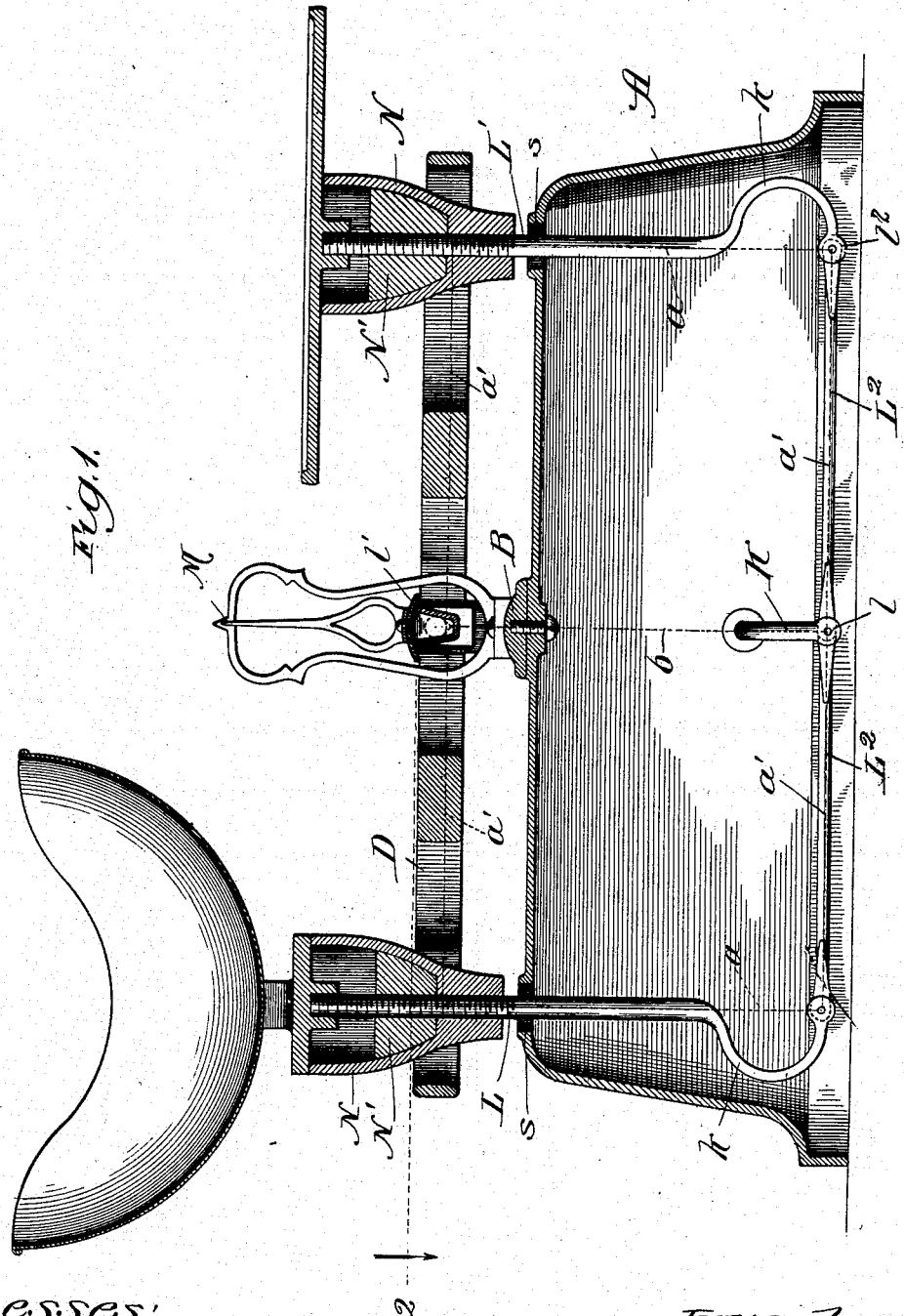

No. 673,834. Patented May 7, 1901.
E. FINN.
COMPUTING EVEN BALANCE SCALE.
(Application filed Dec. 27, 1897.)
(No Model.) 3 Sheets—Sheet 2.
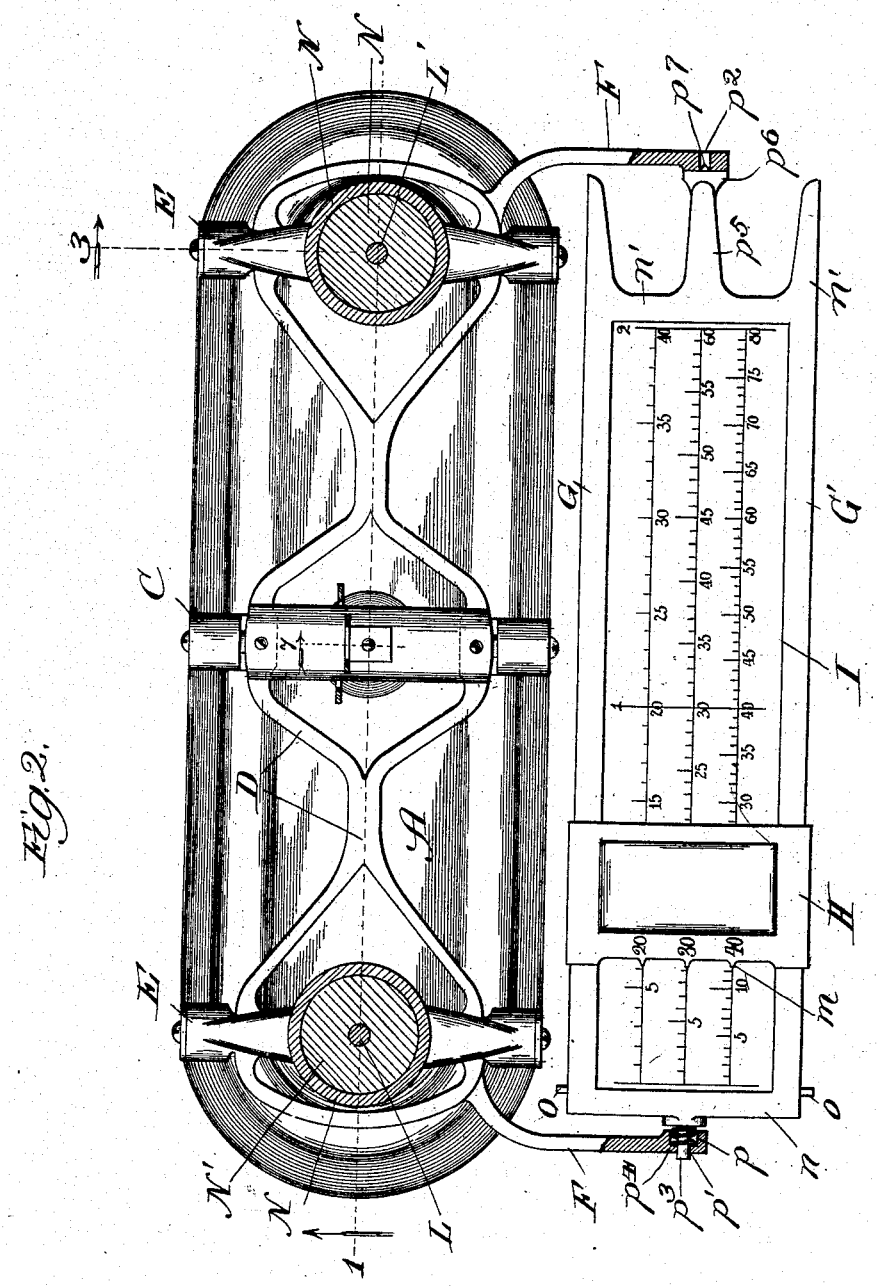
Witnesses:
Inventor,
Edwin Finn, No. 673,834. Patented May 7, 1901.
E. FINN.
COMPUTING EVEN BALANCE SCALE.
(Application filed Dec. 27, 1897.)
(No Model.) 3 Sheets—Sheet 3.
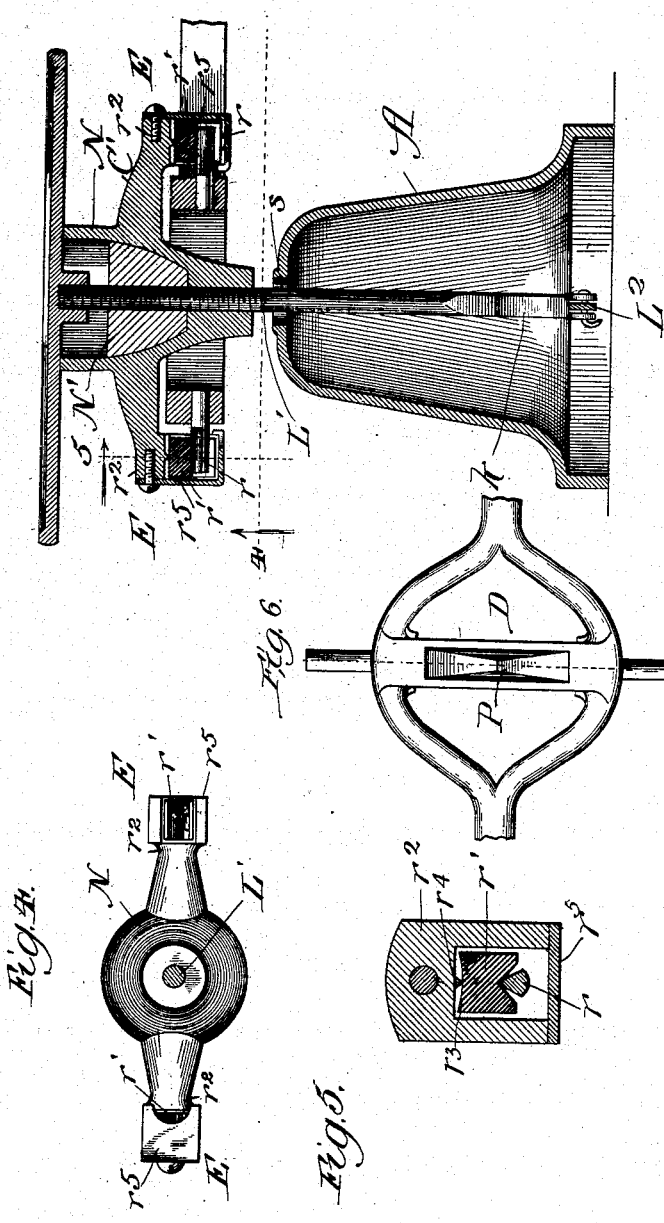
Witnesses:
Inventor:
Edwin Finn,
By Davenport and Davenport
Att'ys

UNITED STATES PATENT OFFICE.

EDWIN FINN, OF ELKHART, INDIANA, ASSIGNOR TO STIMPSON COMPUTING SCALE COMPANY, OF SAME PLACE.

COMPUTING EVEN-BALANCE SCALE.

SPECIFICATION forming part of Letters Patent No. 673,834, dated May 7, 1901.

Application filed December 27, 1897. Serial No. 663,583. (No model.)

*To all whom it may concern:*

Be it known that I, EDWIN FINN, a citizen of the United States, residing at Elkhart, in the county of Elkhart and State of Indiana, have invented a new and useful Computing Even-Balance Scale, of which the following is a specification.

My invention relates to even-balance scales, and particularly to scales of this class which are provided with means of rapid computation.

One object of my invention is, first, to afford a means for greatly economizing the cost of manufacture of scales of this class.

A further object of my invention is to simplify the computing even-balance scale whereby its operation will be more perfect and the cost of construction shall be reduced.

In the manufacture of even-balance scales it is of course of a most vital consequence that the opposite ends of the balance beam or lever shall exactly counterbalance. Where the use of a scale is such that an absolutely uniform distribution of the weight at opposite ends of the balance-beam may be provided for, the problem of producing the perfect counterbalance is a very simple one; but where, as in the case of the even-balance scales in general use, provision must be made for the unequal distribution in the scoop, on the one hand, and on the weight-platform, on the other hand, of the superposed weight thereon it is found necessary to exercise the minutest care in adjusting the parts, so that in all conditions of use an exact balance may be produced. It is common in scales of this kind, known as "Roberval's balance," to extend the stems which support the scoop and the weight-platform, respectively, at each end of the balance-beam, the length of this stem being the exact length of the balance-beam between a point in the vertical line of the center of the scoop or platform and the fulcrum of the balance-beam, and the lower end of this stem is connected by a tie-rod with a fixed point in the frame of the scale in the exact vertical plane of the fulcrum. The effect of this extension of the stem and its connection through a tie-rod with the fixed point named in the scale-frame is to insure absolutely parallel movement thereof and to equalize the leverage of all points on the scoop-platform or the weight-platform. It will be obvious that the leverage of a weight at the outer edge of the weight-platform will normally be greater than the leverage of a weight at the inner edge of the platform; but by the arrangement mentioned this is equalized. It is found in practical manufacture of scales embodying this feature that perfect accuracy in the formation of the square having its four points in the fulcrum, in the fixed point below the fulcrum, in the end of the stem, and in the stem in the plane of the fulcrum cannot be produced in all instances or even usually by the employment of measuring instruments. It is therefore the practice to make the stem of a trifle less than the intended length, to supply its lower end with means for connection with the tie-rod, to secure the upper end to the scale-beam, and then by gently hammering upon the stem to lengthen the same until the actual test of the scale, with the weights at whatever points on the platform, proves a perfect balance to be effected. If through accident or carelessness the stem be made too long by this hammering, manifestly the work theretofore done upon it is wasted. It is a fact that the time and trouble involved in producing the perfect balance is entirely out of proportion to the time and trouble involved in building the scale. The leading feature of my invention is to render this loss of time and the trouble involved in lengthening the stem unnecessary and also to render unnecessary the waste of stems which may have been made too long in the effort to effect the balance. This feature of my invention is accomplished by giving to the stem at some point in its length, and preferably at its lower extremity, a curved or angular form, the lower end of the curve or angular part, which may be described for brevity as a "bow," being in the same vertical plane as the center of the platform. In this manner the stem is actually longer than the distance in a vertical line between its upper and lower extremities, while by increasing or reducing the bow the distance between the upper and lower extremities of the stem in a vertical line may be reduced or increased as little or as much as may be desired. By reason of the bow, moreover, it is possible very easily to rectify any slight error in the length of the tie-rod, although this is not usually necessary if, as has sometimes been done, the fixed point at the inner end of the tie-rod be capable of vertical and horizontal adjustment.

It may here be stated that it is not essential that the curved form be employed for the purpose of increasing the length of the material of the stem, any other form suitable to this end being within my invention.

In computing even-balance scales it has heretofore been the practice to separate the weight-indicating beam from the computing-frame, the weight-indicating beam carrying the poise and the computing-frame having a marker thereon, with numbers designating in different planes the pound-price, which is the multiplicand in the computation. By my improvement the weight-indicating beam forms part of the computing-frame, and in fact each edge of the computing-frame, this frame being revoluble on journals at opposite ends thereof, constitutes a combined weight-indicating and computing beam and the computing-marker takes the form of the sliding poise.

My invention consists, further, in the details of construction and combinations of parts, all as hereinafter more fully set forth.

In the drawings, Figure 1 is a vertical longitudinal sectional view of an even-balance scale provided with my improvements, taken on the line 1 of Fig. 2. Fig. 2 is a sectional plan view taken on the line 2 of Fig. 1. Fig. 3 is a transverse vertical section on the line 3 of Fig. 2. Fig. 4 is a bottom broken sectional plan view on the line 4 of Fig. 3; Fig. 5, a vertical transverse section on the line 5, Fig. 3, illustrating one of the bearings; Fig. 6, a broken plan view of the central portion of the balance-beam, showing a receptacle to receive material for perfecting the gravity-balance; and Fig. 7, a section taken on line 7 of Figs. 6 and 2.

A represents the hollow base of an even-balance scale, having at opposite ends in its upper face the perforations $s$ to receive the stems and having in its center and preferably screwed or riveted thereto the upward-extending arms B, terminating in their opposite extremities in the fulcrum-bearings C. Fulcrumed in the bearings C in the manner presently shown is the balance-beam D, the design of which is a matter of choice, and which balance-beam has near each extremity the opposite bearings E, which support the scoop-platform and the weight-platform, respectively. Extending in the same general direction from each end of the balance-beam D are bracket-arms F. These arms support the combined weight-indicating beam and computing-frame in a manner presently described. The fulcrum-bearings at C and the platform-bearings at E are knife-edge bearings. The platform-bearing is illustrated in Figs. 3, 4, and 5 and comprises the outward-extending fixed knife-edge $r$ and the bearing-block $r'$, having in its under face the V-shaped recess shown. The upper face of the bearing-block is provided with a round recess $r^3$ and receives and supports the platform-base $r^2$, which is provided with a conical lug or projection $r^4$, resting in the recess. The bearing for convenience is covered with the angular plate $r^5$, as illustrated in the figures. In the case of the fulcrum-bearing at C substantially this arrangement is employed, with the difference that the knife-edges are downturned, while the bearing-blocks (carried by the arms or standards B) have the V-shaped recesses in their upper faces.

The outward-extending bracket-arm F at one end of the balance-beam is provided with the cup-shaped recess $p$ and the perforation $p'$. The bracket-arm F at the opposite end of the balance-beam has its extremity centrally perforated, as indicated at $p^2$. The weight-indicating beam is in the form of two parallel bars G G'. Each bar G G' has toward its inner extremity a stud $o$. Embracing both parallel bars G G' and adapted to slide thereon is the weighted poise H. This poise has index-spurs projecting from one side thereof, and at each spur is a figure representing a multiplicand. The bars G G' are joined at opposite ends by vertical bars $n$ $n'$, which, with the bars G G', form a perfect rectangular parallelogram. Projecting outward from the side $n$ of the frame is a pin $p^3$, which enters the perforation $p'$ in the bracket F and is surrounded by the spring $p^4$. The opposite side of the frame has a centrally-projecting pin $p^5$, terminating in the head $p^6$, from the center of which projects the conical stud $p^7$, which enters the perforation $p^2$. By this arrangement the frame may be readily introduced into and withdrawn from the bracket F F and when held in the bracket may be easily and freely rotated. In the frame is placed a computing scale-card I, having horizontal lines corresponding to the spurs $m$ on the poise H. It also has the weight-markings along the upper line on each side. This card, as is usual in computing-scales, has each line thereon marked with spaces and figures, giving the product obtained by multiplying the multiplicand, or pound value of the article weighed, by the multiplier obtained from the weight indicated on the tare-beam. It is usual to mark both faces of the card with computing-scales, which in practice indicate the products on the basis of prices below twenty cents per pound on one side and above twenty cents per pound on the other, and the poise H has marked upon its face on one side the multiplicands exceeding twenty cents and on the other side the multiplicands below twenty cents. In Fig. 2 the poise H is shown supplied with price-indicating characters "20," "30," and "40," and the card I with weight-indicating divisions ranging from one-twentieth of a pound to two pounds. Opposite each price-indicating character and adjacent to selected weight-indicating divisions are placed computations. Thus, opposite the price-indicating character "20" and adjacent to the weight-division indicating one-fourth of a pound occurs the figure "5," indicating the cost of one-quarter of a pound at twenty cents per pound. I have not deemed it necessary in the drawings to show both sides of the poise H, as the revoluble computing-frame is, as such, not new. In no even-balance scale with which I am familiar, however, has it heretofore been deemed practicable to utilize either or both of the bars G G' as the weight-indicating poise-beam, and to cause the poise H to serve the purpose of the sliding indicator on the computing-scale.

As heretofore explained, it is essential in the so-called "Roberval's balance," such as the even-balance scale to which my invention is directed, that the lines $a$, Fig. 1, shall be exactly parallel, that the lines $a'$ $a'$ shall be exactly parallel, and that the lines $b$ shall be exactly parallel with the lines $a$ and exactly bisect the lines $a'$. In practice it is usual to secure to the base of the scale an arm K, the extremity of which, as indicated at $l$, is in the exact vertical line below the fulcrum $l'$ of the scale-beam D and the exact distance downward therefrom that the center of the weight-platform is laterally from the fulcrum. It is usual, also, to extend the stems L L' downward from the scoop-platform and weight-platform to a point in the exact horizontal plane of the end $l$ of the bracket-arm K and to connect the end $l^2$ of the stem L L' with the extremity $l$ of the bracket K with a tie-rod $L^2$. It is vital, however, that in this mechanical construction of the four sides of the parallelograms perfect squares shall be produced, and it is found that it is entirely unsafe to rely upon mechanical measurements to insure perfect accuracy in this regard. It has already been explained that the practice heretofore has been to lengthen the stem L L' by hammering thereon until a test made by placing the weight at various points on the weight-platform and on the scoop-platform shows that absolutely perfect balance in all positions of the weight is obtained. It has also been explained that the delicacy of this operation of lengthening the stem is such that if it should be made too long it is substantially impossible to correct it. With a view to remedying this objection I have given to the lower end of each stem L L' a semicircular curvature, as indicated at $k$, the extremity of the stem being brought to a point in the vertical line of the center of the platform. As the stem is made of so-called "soft metal," it may easily be bent to increase or reduce the curvature at $k$, with the result that any inaccuracy in the stem L L' may quickly be corrected to change the location of the extremity of the stem where it is secured to the tie-rod $L^2$ in either a vertical or horizontal plane. It will be obvious that the curve $k$ may be located elsewhere in the stem than at the extremity and that the shape of the curve or bent portion is immaterial, so long as it results in giving to the stem a greater length, in fact, than the distance between its upper and lower extremities.

It is necessary to have the center of gravity of the balance-beam in the line of the knife-blade edges of the bearings at C. Otherwise the sensitiveness to movement of the beam is destroyed to a more or less extent or it will move so readily as to "dive," making it quite impossible to bring the scale to a balance. To bring the center of gravity to the line of the knife-blade edges, it has been usual hitherto when adjusting the scale to wear off the knife-blade edges, usually with emery or the like, until the desired result is obtained. This process is necessarily very tedious. I provide in my construction a receptacle P, into which soft metal or other suitable material may be poured or placed and increased or diminished in quantity as desired to give a perfect gravity-balance. One or more such receptacles may be employed and located in any desired position or positions on the scale-beam. Thus instead of perfecting the gravity-balance by the slow and unsatisfactory process of wearing off the hardened knife-blade bearing edges I obtain the same result in a more satisfactory manner by adding to or taking from the metal in the receptacle or receptacles P. Thus, broadly stated, I produce the perfect gravity-balance by the adjustment of weight in proper location on the scale-beam instead of changing the knife-blade bearing edges.

Many details of the even-balance scale here shown are so common as to require no special description—as, for example, the indicator M, mounted upon the balance-beam, and the cups N N, which receive soft metal N' and constitute the bases of the scoop-platform and weight-platform, respectively.

What I claim as new, and desire to secure by Letters Patent, is—

1. In a Roberval or even-balance scale, the combination with the balance-beam and its fulcrum and the lower tie-rods and their fulcrum, of the stems joining the balance-beam and tie-rods, and means for varying the distance between the extremities of the stems consisting of a bend in each stem capable of being increased or diminished, said bend being located in the body of the stem between the pivotal points thereof.

2. In a Roberval or even-balance scale, the combination with the balance-beam and its fulcrum and the tie-rods and their fulcrum, of the stems connecting the balance-beam and tie-rods, and means for varying the distance between the extremities of the stems consisting of a bend in each stem toward its lower extremity capable of being increased or diminished, said bend being located in the body of the stem between the pivotal points thereof.

3. In an even-balance computing-scale, the combination of a base provided with central balance-beam bearings, a balance-beam mounted centrally of its length on said bearings and provided at its ends with platform-bearings, load and weight platforms mounted on said platform-bearings, brackets projecting laterally from said balance-beam, a readily-removable revoluble beam G G' n n' provided with pivotal studs at its ends, said beam being capable of longitudinal movement between said brackets, a spring holding said beam normally against longitudinal movement, a card in said revoluble beam provided with cost computations, and a poise sliding on said revoluble beam and provided with price-indicating characters, substantially as and for the purpose set forth.

4. In an even-balance scale, the combination with a base provided with bearings, a balance-beam pivoted centrally of its length on said bearings and provided at its ends with platform-bearings, and a receptacle at the center of said beam for receiving gravity-center-adjusting material, said receptacle having its location between such horizontal planes and such vertical planes that the center of gravity of the beam may be raised or lowered by removing or adding material and without destroying the equipoise, substantially as and for the purpose set forth.

5. In an even-balance scale, the combination with a base provided with bearings, and a balance-beam pivoted centrally of its length on said bearings and provided with an accurately centrally located receptacle for receiving gravity-center-adjusting material, said receptacle being located between such horizontal planes with relation to the horizontal plane containing the center of gravity of the beam prior to sealing as to permit shifting of the center of gravity to a higher plane and toward the plane of the beam-fulcrum knife-edges, substantially as and for the purpose set forth.

EDWIN FINN.

In presence of—
M. J. FROST,
R. T. SPENCER.